United States Patent [19]

Copeland et al.

[11] 4,360,601

[45] Nov. 23, 1982

[54] PROCESS FOR EXTRACTION OF FLUORINATED COPOLYMERS WITH FLUOROCARBONS

[75] Inventors: Terry M. Copeland; Paul R. Resnick, both of Wilmington, Del.

[73] Assignee: E. I. Du Pont de Nemours and Company, Wilmington, Del.

[21] Appl. No.: 214,997

[22] Filed: Dec. 10, 1980

[51] Int. Cl.$^3$ .......................... B01J 39/00; C08F 6/00
[52] U.S. Cl. ....................................... 521/27; 203/43; 204/296
[58] Field of Search ..................... 521/38, 27; 204/296

[56] References Cited

U.S. PATENT DOCUMENTS 3,221,070 11/1965 Okamura et al. ..................... 203/43
4,131,740 12/1978 England .............................. 526/247
4,243,508 1/1981 Donkese ............................. 521/27

FOREIGN PATENT DOCUMENTS 7802225 4/1979 South Africa.

OTHER PUBLICATIONS

Publications or Products (1975), p. 3.

*Primary Examiner*—William F. Hamrock
*Assistant Examiner*—Peter F. Kulkosky

[57] ABSTRACT

A process for extracting a fluorinated polymer which contains carboxylic ester functional groups with a liquid compound which is preferably a perchlorofluorocarbon having a boiling point in the range of 30° to 125° C. is described. Polymer so extracted can be fabricated into a membrane and hydrolyzed to ion exchange form to provide a membrane for electrolytic cells. When used as the membrane for a chloralkali cell, such membrane provides improved performance, e.g., a high level of current efficiency and low power consumption are maintained for an extended period of time when compared against a membrane of like construction fabricated from polymer which has not been so extracted.

14 Claims, No Drawings

PROCESS FOR EXTRACTION OF FLUORINATED COPOLYMERS WITH FLUOROCARBONS

BACKGROUND OF THE INVENTION

Fluorinated ion exchange polymers having carboxylic acid functional groups are known in the art. One principal use of such polymers is as a component of a membrane used to separate the anode and cathode compartments of a chloralkali electrolysis cell. Such membrane can be in the form of a reinforced or unreinforced film or laminar structure which may incorporate other polymers which may or may not carry other functional groups, such as fluorinated ion exchange polymers having sulfonyl functional groups which are in ionic or ionizable form.

It is desirable for use in a chloralkali cell that the membranes provide for operation at low voltage and high current efficiency, and thereby at low power consumption, so as to provide products of high purity at low cost, especially in view of today's steadily increasing cost of energy. It is further desirable that membranes having such performance characteristics are capable of providing those characteristics over an extended period of time, as such membranes themselves are expensive to make, and replacement additionally interrupts the electrolysis process.

It is therefore important to provide such membranes having improvement in said performance characteristics, and ways to improve the characteristics of known membranes. Such are the objects of this invention.

SUMMARY OF THE INVENTION

We have now found that extraction of fluorinated polymers having carboxylic ester functional groups with, e.g., a chlorofluorocarbon solvent before fabrication of an ion exchange membrane therefrom leads to a membrane which maintains a high current efficiency and low power consumption for a longer period of time than does a membrane fabricated from unextracted polymer.

More specifically, according to the invention there is provided a process comprising extracting a fluorinated polymer having —COOR functional groups, where R is lower alkyl, with a liquid compound having the formula $$C_jCl_gF_fH_h,$$

where:
  j is an integer of at least 1,
  each of g, f and h is zero or an integer of at least 1,
  provided that $g+f+h$ is $2j+2$ in the case of alkanes, and is $2j$ in the case of cycloalkanes, and
  further provided that the normal boiling point is in the range of 30° to 125° C.,
said extraction being carried out for a total period of time of from 15 minutes to 72 hours at a pressure in the range of $10^4$ to $10^6$ pascals, and drying the resulting extracted polymer.

There are also provided according to the invention improved polymer made in accordance with said process, improved ion exchange polymer formed therefrom by hydrolysis, membranes thereof, an electrolytic cell which includes such membrane, and an electrolysis process, especially for brine, which employs such membrane.

DETAILED DESCRIPTION OF THE INVENTION

The polymer with which the present invention is concerned is typically a polymer having a fluorinated hydrocarbon backbone chain to which are attached the functional groups or pendant side chains which in turn carry the functional groups. The pendant side chains can contain, for example

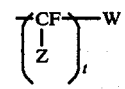

groups wherein Z is F or $CF_3$, t is 1 to 12, and W is —COOR or —CN, where R is lower alkyl. Ordinarily, the functional group in the side chains of the polymer will be present in terminal

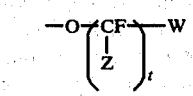

groups. Examples of fluorinated polymers of this kind are disclosed in British Pat. No. 1,145,445 and U.S. Pat. No. 3,506,635. More specifically, the polymers can be prepared from monomers which are fluorinated or fluorine-substituted vinyl compounds. The polymers are usually made from at least two monomers. At least one monomer is a fluorinated vinyl compound such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen. Additionally, at least one monomer is a fluorinated monomer which contains a group which can be hydrolyzed to a carboxylic acid group, e.g., a carboalkoxyl or nitrile group, in a side chain as set forth above.

By "fluorinated polymer" is meant a polymer in which, after loss of the R group by hydrolysis to ion exchange form, the number of F atoms is at least 90% of the number of F atoms and H atoms.

The monomers, with the exception of the R group in the —COOR, will preferably not contain hydrogen, especially if the polymer will be used in the electrolysis of brine, and for greatest stability in harsh environments, most preferably will be free of both hydrogen and chlorine, i.e., will be perfluorinated; the R group need not be fluorinated as it is lost during hydrolysis when the functional groups are converted to ion exchange groups.

One exemplary suitable type of carboxyl-containing monomer is represented by the formula:

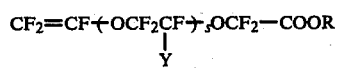

wherein:
  R is lower alkyl,
  Y is F or $CF_3$, and
  s is 0, 1 or 2.

Those monomers wherein s is 1 are preferred because their preparation and isolation in good yield is more easily accomplished than when s is 0 or 2. The compound:

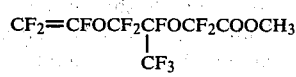
$$CF_2=CFOCF_2CFOCF_2COOCH_3$$
$$|$$
$$CF_3$$

is an especially useful monomer. Such monomers can be prepared, for example, from compounds having the formula:

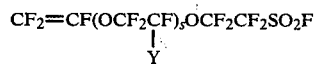
$$CF_2=CF(OCF_2CF)_sOCF_2CF_2SO_2F$$
$$|$$
$$Y$$

wherein s and Y are as defined above, by (1) saturating the terminal vinyl group with chlorine to protect it in subsequent steps by converting it to a $CF_2Cl—CFCl—$ group; (2) oxidation with nitrogen dioxide to convert the $—OCF_2CF_2SO_2F$ group to an $—OCF_2COF$ group; (3) esterification with an alcohol such as methanol to form an $—OCF_2COOCH_3$ group; and (4) dechlorination with zinc dust to regenerate the terminal $CF_2=CF_{13}$ group. It is also possible to replace steps (2) and (3) of this sequence by the steps (a) reduction of the $—OCF_2CF_2SO_2F$ group to a sulfinic acid, $—OCF_2CF_2SO_2H$, or alkali metal or alkaline earth metal salt thereof by treatment with a sulfite salt or hydrazine; (b) oxidation of the sulfinic acid or salt thereof with oxygen or chromic acid, whereby $—OCF_2COOH$ groups or metal salts thereof are formed; and (c) esterification to $—OCF_2COOCH_3$ by known methods; this sequence is more fully described in South African Pat. No. 78/2224. Preparation of copolymers thereof is described in South African Pat. No. 78/2221.

Another exemplary suitable type of carboxyl-containing monomer is represented by the formula:

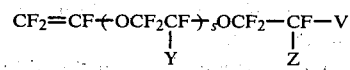
$$CF_2=CF(OCF_2CF)_sOCF_2—CF—V$$
$$\quad\quad\quad\quad\quad |\quad\quad\quad\quad |$$
$$\quad\quad\quad\quad\quad Y\quad\quad\quad\quad Z$$

wherein:
V is $—COOR$ or $—CN$,
R is lower alkyl,
Y is F or $CF_3$,
Z is F or $CF_3$, and
s is 0, 1 or 2.

The most preferred monomers are those wherein V is $—COOR$ wherein R is lower alkyl, generally $C_1$ to $C_5$, because of ease in polymerization and conversion to ionic form. Those monomers wherein s is 1 are also preferred because their preparation and isolation in good yield is more easily accomplished than when s is 0 or 2. Preparation of those monomers wherein V is $—COOR$ where R is lower alkyl, and copolymers thereof, is described in U.S. Pat. No. 4,131,740. The compounds:

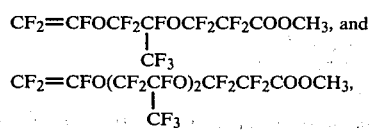
$$CF_2=CFOCF_2CFOCF_2CF_2COOCH_3, \text{ and}$$
$$|$$
$$CF_3$$
$$CF_2=CFO(CF_2CFO)_2CF_2CF_2COOCH_3,$$
$$|$$
$$CF_3$$

whose preparation is described therein, are especially useful monomers. Preparation of monomers wherein V is $—CN$ is described in U.S. Pat. No. 3,852,326.

Yet another suitable type of carboxyl-containing monomer is that having a terminal $—O(CF_2)_vCOOCH_3$ group where v is from 2 to 12, such as $CF_2=CF—O(CF_2)_3COOCH_3$ and $CF_2=CFOCF_2CF(CF_3)O(CF_2)_3COOCH_3$. Preparation of such monomers and copolymers thereof is described in Japanese Patent Publications Nos. 38486/77 and 28586/77, and in British Pat. No. 1,145,445.

Another class of carboxyl-containing polymers is represented by polymers having the repeating units:

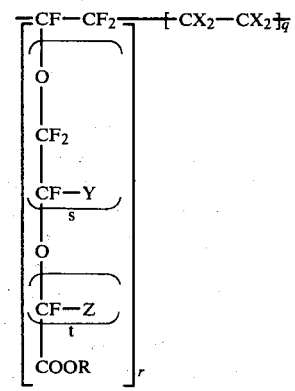

wherein:
q is 3 to 15,
r is 1 to 10,
s is 0, 1 or 2,
t is 1 to 12,
the X's taken together are four fluorines or three fluorines and one chlorine,
Y is F or $CF_3$,
Z is F or $CF_3$, and
R is lower alkyl.

A preferred group of copolymers are those of tetrafluoroethylene and a compound having the formula

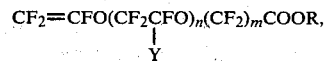
$$CF_2=CFO(CF_2CFO)_n(CF_2)_mCOOR,$$
$$|$$
$$Y$$

where:
n is 0, 1 or 2,
m is 1, 2, 3 or 4,
Y is F or $CF_3$, and
R is $CH_3$, $C_2H_5$ or $C_3H_7$.

When used in a film or membrane to separate the anode and cathode compartments of an electrolysis cell, such as a chloralkali cell, the polymer, after conversion to ionizable form, should have a total ion exchange capacity of 0.5 to 2 meq/g (milliequivalents/gram), preferably from 0.8 to 1.4 meq/g. Below an ion exchange capacity of 0.5 meq/g, the electrical resistivity becomes too high, and above 2 meq/g the mechanical properties are poor because of excessive swelling of the polymer. The relative amounts of the comonomers which make up the polymer should be adjusted or chosen such that the polymer has an equivalent weight no greater than about 2000, preferably no greater than about 1400, for use as an ion exchange barrier in an electrolytic cell. The equivalent weight above which the resistance of a film or membrane becomes too high for practical use in an electrolytic cell varies somewhat with the thickness of the film or membrane. For thinner films and membranes, equivalent weights up to about 2000 can be tolerated. For most purposes, however, and for films of ordinary thickness, a value no greater than about 1400 is preferred.

Such copolymers with which the present invention is concerned can be prepared by techniques known in the art, e.g., U.S. Pat. No. 3,528,954, U.S. Pat. No. 4,131,740, and South African Pat. No. 78/2225.

In accordance with the present invention, such copolymer is extracted with a liquid compound which is a saturated liquid alkane or cycloalkane which is unsubstituted or partially or fully substituted by fluorine and/or chlorine, which compound has a normal boiling point of about 30° to 125° C. Such compounds have the formula $C_jCl_gF_fH_h$, where:

J is an integer of at least 1,
each of g, f and h is zero or an integer of at least 1,
provided that $g+f+h$ is $2j+2$ in the case of alkanes, and is $2j$ in the case of cycloalkanes,
and further provided that the normal boiling point is in the range of 30° to 125° C.

By normal boiling point is meant the boiling point at $1.01325 \times 10^5$ pascals (1 Atmosphere). Preferably, the normal boiling point of the liquid compound is in the range of 40° to 110° C., and most preferably is below 100° C.

Preferably, the liquid compound is a perhalocarbon, that is, a compound which satisfies the above formula where h is zero. Such liquid compounds are preferred because the extraction process with them is more efficient, and because they are nonflammable.

The extraction is carried out at a pressure in the range of about $10^4$ to $10^6$ pascals, for a period of time from about 15 minutes to 72 hours, preferably for a period of 3 hours to 24 hours. The extraction is preferably carried out at a temperature near the boiling point of the liquid compound at the pressure employed in the process, as the extraction will be most efficient at that temperature. Preferably, the pressure will be about $10^5$ pascals (1 Atmosphere), as this is most convenient.

The extraction can be carried out either as a batch, semi-continuous, or continuous process.

In a continuous process, a closed vessel having vapor seals of a type known in the art at the points where copolymer is introduced into and removed from the vessel, means to transport the copolymer from an entry point to an exit point, and valves for the introduction of the liquid compound and removal of liquid extract, can be used.

In a semi-continuous process, e.g., the liquid compound can be continuously allowed to flow through an initial charge of the copolymer.

In a batch process, an initial charge of liquid compound is repetitively distilled into an initial charge of the copolymer, and then returned to the still pot, as in a Soxhlet extractor. In a repetitive process of this kind, each individual contacting step is generally carried out for a time of about 1 minute to 12 hours, the total time for all the repetitive steps being about 15 minutes to 72 hours.

In all cases, for the sake of economy, the liquid compound can be recovered from the liquid extract by vaporization and condensation, and returned to the process for reuse.

Copolymers of tetrafluoroethylene and an alkyl ester of a perfluorovinyl ether carboxylic acid, as obtained from a polymerization, comprise individual polymer chains having a distribution of molecular weights and equivalent weights. Copolymer which has been extracted in the manner described herein has both a higher molecular weight, as measured by its melt flow, and a higher equivalent weight than the copolymer introduced to the process. Oligomers having low molecular weight and/or low equivalent weight are removed from the copolymer in the extraction process, thus incurring some loss in weight during extraction. A copolymer feed having an initial low equivalent weight will usually undergo a greater weight loss and a greater increase in equivalent weight during extraction than does a copolymer feed having a higher equivalent weight.

The extracted copolymer, after hydrolysis to ion exchange form, i.e., to the form wherein the functional groups are —COOM groups, where M is H, Na, K or $NH_4$, is useful for ion exchange purposes, such as packing for ion exchange columns, and as a component of ion exchange membranes. It can also be used as catalyst for various acid catalyzed chemical reactions.

A principal use is in the form of a membrane for electrochemical cells. Such a cell comprises an anode, a compartment for the anode, a cathode, a compartment for the cathode, and a membrane which is situated to separate the two said compartments. One example is a chloralkali cell, for which the membrane should have the functional groups in salt form.

Said membrane can be as simple as a film of said copolymer, or may be a laminar structure having two or more layers, there being at least one layer of said copolymer or a blend of said copolymer with another ion exchange polymer. The other ion exchange polymer in the remaining layers and/or in a blended layer can be, e.g., a copolymer having sulfonic acid or sulfonic acid salt (such as Na, K or $NH_4$) functional groups. The membrane, whether of a single layer or of plural layers, can optionally contain a support material such as a fabric of strands of an inert polymer, e.g., polytetrafluoroethylene, embedded therein. Techniques for fabricating membranes of these types are known in the art.

Said membrane is improved over those of the prior art, because it shows continued high current efficiency for an appreciably longer period of time in a chloralkali cell than a membrane fabricated from polymer which has not been so extracted.

To further illustrate the innovative aspects of the present invention, the following examples are provided.

In the examples, copolymer was made by a process like that described in U.S. Pat. No. 4,131,740, column 7, lines 21-35, except that it was on larger scale in a metal pressure vessel or autoclave, and that the ratio of the olefinic monomers was varied to produce copolymers of higher or lower equivalent weight as desired.

EXAMPLE 1

A sample of a copolymer of tetrafluoroethylene and methyl perfluoro(4,7-dioxa-5-methyl-8-nonenoate) in the form of fluff was divided into two parts. Part A was retained as a control.

Part B of the sample, which weighed 51.73 g, was repetitively extracted with 1,1,2-trichloro-1,2,2-trifluoroethane at its boiling point in a Soxhlet extractor at atmospheric pressure for about 24 hours. The recovered polymer after drying weighed 42.4 g (82% recovery).

Each portion of polymer was separately pressed at 250° C. into a membrane in the form of a film having a thickness of 0.15 mm (0.006 inch). The membranes were then hydrolyzed to the form with —COOK functional groups in a mixture of dimethyl sulfoxide, potassium hydroxide and water at 90° C. for one hour, and washed.

The two membranes were mounted in separate chloralkali electrolytic cells and operated under the same conditions at 80° C. and 3.1 KA/m$^2$, producing 32% NaOH. After 28 days on line, the cell containing membrane A had declined to a current efficiency of 92.75% and membrane A had taken on a hazy appearance, while the cell containing membrane B remained at 95.06% and membrane B remained clear, and both cells were operating in equivalent voltage ranges, at about 3.84 volts.

EXAMPLE 2

Two samples of copolymer of tetrafluoroethylene and methyl perfluoro(4,7-dioxa-5-methyl-8-nonenoate) in the form of fluff were designated sample A and sample B. Sample A was retained as a control. Sample B was repetitively extracted with 1,1,2-trichloro-1,2,2-trifluoroethane at its boiling point in a Soxhlet extractor at atmospheric pressure for 24 hours, and dried.

Sample A and sample B were then separately extruded into film having a thickness of 0.05 mm (0.002 inch) to provide film A and film B.

Each film was then separately laminated to a film of a copolymer of tetrafluoroethylene and perfluoro(3,6-dioxa-4-methyl-7-octanesulfonyl fluoride) having a thickness of 0.127 mm (0.005 inch), with a reinforcing fabric between the two films, using heat and pressure, to provide two laminar membranes. The reinforcing fabric was woven from 200 denier (0.127 mm, 0.005 inch) polytetrafluoroethylene yarn, had a thread count of 5.1 per cm (13 per inch) in the warp and 6.3 per cm (16 per inch) in the weft, was calendered to a thickness of 0.28–0.30 mm (11–12 mils), and had an open area of 54%. These membranes were then hydrolyzed to the form having —COOK functional groups in one layer and —SO$_3$K functional groups in the other layer, in a mixture of dimethyl sulfoxide, potassium hydroxide and water at 90° C. for one hour, and washed, to provide membrane A (from sample A) and membrane B (from sample B).

The two membranes were mounted separately in chloralkali cells with the carboxylic layer facing the catholyte, and operated under the same conditions, at 80° C. and 3.1 KA/m$^2$, producing 32% NaOH. After 38 days on line, the cell containing membrane B was still operating at 95.0% current efficiency and membrane B remained clear, while the cell containing membrane A had declined to 89.76% current efficiency and membrane A had become cloudy.

EXAMPLE 3

A sample of a copolymer of tetrafluoroethylene and CF$_2$=CFOCF$_2$CF(CF$_3$)OCF$_2$CF$_2$COOCH$_3$ in the form of fluff was divided into two parts. Part A was retained as a control.

Part B of the sample, which weighed 25.0 g, was repetitively extracted with 1,1,2-trichloro-1,2,2-trifluoroethane at its boiling point in a Soxhlet extractor at atmospheric pressure for 22.5 hours. The polymer remaining after extraction weighed 23.8 g (95.2% recovery).

Each portion of polymer was pressed into a membrane in the form of a film at 250° C. The membranes were hydrolyzed to the form with —COOK functional groups in a mixture of dimethyl sulfoxide, potassium hydroxide and water at 90° C. for one hour, and washed.

Membrane A (from part A) had an ion exchange capacity of 0.789 meq/g as determined by resistivity correlation, which corresponds to an equivalent weight of 1267. Membrane B (from part B) had an ion exchange capacity of 0.739 meq/g, which corresponds to an equivalent weight of 1352.

A pale colored grease was recovered from the extract by evaporation of the extractant. This grease exhibited a very strong methyl carboxylate absorption at 1786 cm$^{-1}$ in its infrared spectrum, and had an equivalent weight of 554 and 1.80 meq of carboxylic groups per gram as estimated from the infrared spectrum.

INDUSTRIAL APPLICABILITY

Membrane prepared from polymer treated by the extraction process described is technically advanced over membranes of the prior art. It exhibits improved performance characteristics when used as membrane in a chloralkali electrolysis cell, e.g., operation at high current efficiency and low power consumption for an appreciably longer period of time than membrane made from polymer which has not been treated by the process described. In addition to the saving in operating costs resulting from the lowered consumption of power, there is also a saving associated with the extended life of the membrane which results in less frequent replacement costs.

We claim:

1. A process comprising extracting a fluorinated polymer having —COOR functional groups, where R is lower alkyl, with a liquid compound having the formula:

$$C_jCl_gF_fH_h,$$

where:
  j is an integer of at least 1,
  each of g, f and h is zero or an integer of at least 1,
  provided that g+f+h is 2j+2 in the case of alkanes, and is 2j in the case of cycloalkanes, and
  further provided that the normal boiling point is in the range of 30° to 125° C.,
said extraction being carried out for a total period of time of from 15 minutes to 72 hours at a pressure in the range of 10$^4$ to 10$^6$ pascals, and drying the resulting extracted polymer.

2. The process of claim 1 wherein said liquid compound is continuously passed through said polymer for said period of time, whereby a resulting liquid extract is collected separate from a resulting solid polymer phase.

3. The process of claim 1 wherein said extracting comprises the steps of:
  (a) contacting said fluorinated polymer with said liquid compound, said contacting being carried out for a period of from 1 minute to 12 hours, and separating a resulting liquid extract from a resulting solid polymer phase;
  (b) repeating step (a) a plurality of times, employing said resulting solid polymer phase as said fluorinated polymer, the time for all repetitions of step (a) being said total period of time.

4. The process of claim 2 or 3 wherein said pressure is about $10^5$ pascals, and said extracting is at a temperature near the boiling point of said liquid compound at said pressure.

5. The process of claim 4 wherein said fluorinated polymer is a perfluorinated polymer, h is zero, and the boiling point of said liquid compound is in the range of 40° to 110° C.

6. The process of claim 5 wherein distillate is recovered from said resulting liquid extract by vaporization and condensation and is returned to said process as said liquid compound.

7. The process of claim 4 wherein said fluorinated polymer is a copolymer of tetrafluoroethylene and a compound having the formula

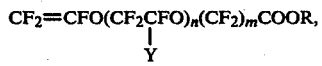

where:
n is 0, 1 or 2,
m is 1, 2, 3 or 4,
Y is F or $CF_3$, and
R is $CH_3$, $C_2H_5$ or $C_3H_7$.

8. The process of claim 7 wherein n is 1, m is 2, Y is $CF_3$, and R is $CH_3$.

9. The process of claim 7 wherein said liquid compound is 1,1,2-trichloro-1,2,2-trifluoroethane.

10. The resulting solid polymer formed in the process of claim 7.

11. An ion exchange polymer having —COOM functional groups, where M is H, Na, K or $NH_4$, formed by hydrolysis of said resulting solid polymer of claim 10.

12. An ion exchange membrane in which there is a layer which comprises said ion exchange polymer of claim 11.

13. An electrolytic cell which comprises an anode compartment, an anode situated within said anode compartment, a cathode compartment, a cathode situated within said cathode compartment, and, between said compartments, said membrane of claim 12.

14. In a process for electrolysis of brine in a chloralkali cell which comprises an anode, a cathode, an anode compartment, a cathode compartment, and a fluorine-containing cation exchange membrane which separates said compartments, to form caustic and chlorine, the improvement which comprises employing as said membrane the membrane of claim 12.

* * * * *